United States Patent
McKisson et al.

(10) Patent No.: US 12,092,786 B2
(45) Date of Patent: Sep. 17, 2024

(54) SUBSURFACE CONTINUOUS RADIOISOTOPE ENVIRONMENTAL MONITOR

(71) Applicant: JEFFERSON SCIENCE ASSOCIATES, LLC, Newport News, VA (US)

(72) Inventors: John E. McKisson, Williamsburg, VA (US); Brian Kross, Yorktown, VA (US); John McKisson, Yorktown, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 100 days.

(21) Appl. No.: 17/977,310

(22) Filed: Oct. 31, 2022

(65) Prior Publication Data

US 2023/0146249 A1 May 11, 2023

Related U.S. Application Data

(60) Provisional application No. 63/276,720, filed on Nov. 8, 2021.

(51) Int. Cl.
*G01V 5/06* (2006.01)
*G01T 1/17* (2006.01)
*G01T 1/20* (2006.01)
*G01V 5/04* (2006.01)

(52) U.S. Cl.
CPC ............ *G01V 5/06* (2013.01); *G01T 1/17* (2013.01); *G01T 1/2006* (2013.01); *G01T 1/201* (2013.01); *G01T 1/20185* (2020.05); *G01T 1/20188* (2020.05); *G01V 5/045* (2013.01)

(58) Field of Classification Search
CPC .... G01V 5/06; G01T 1/20188; G01T 1/20185
See application file for complete search history.

(56) References Cited

U.S. PATENT DOCUMENTS

| | | | | |
|---|---|---|---|---|
| 4,381,882 A | * | 5/1983 | Sabine | G02B 6/4246 250/227.24 |
| 5,707,736 A | * | 1/1998 | Levy | D06M 16/00 428/394 |
| 5,793,046 A | * | 8/1998 | Jeffers | G01T 1/178 250/367 |

(Continued)

*Primary Examiner* — Hugh Maupin

(57) ABSTRACT

A subsurface continuous radioisotope environmental monitor that provides a continuous monitoring of the possible presence of radioactive species in subsurface groundwater. The detector and all supporting system elements are specifically constructed and equipped to be permanently mounted in a well or borehole to continuously detect and record radiation decay of radioactive species that are borne by subsurface water flow to that sampling area. The system operates by placing a detection element in a housing such that subsurface water that reaches the bore or well can flow in contact with the detection element. The system can employ several detection modes and materials. The detector includes SiPMs operating in a coincidence spectroscopy configuration to significantly reduce spurious signals due to thermal noise as well as increasing the total amount of signals collected.

11 Claims, 1 Drawing Sheet

(56) References Cited

U.S. PATENT DOCUMENTS

| | | | |
|---|---|---|---|
| 2004/0026127 A1* | 2/2004 | Masui | E21B 49/02 |
| | | | 175/58 |
| 2016/0266260 A1* | 9/2016 | Preston | G01T 1/208 |
| 2018/0128070 A1* | 5/2018 | Chang | C08B 5/14 |
| 2019/0144738 A1* | 5/2019 | Agrawal | C09K 8/605 |
| | | | 166/280.2 |
| 2021/0208303 A1* | 7/2021 | Jurczyk | G01V 5/101 |

\* cited by examiner

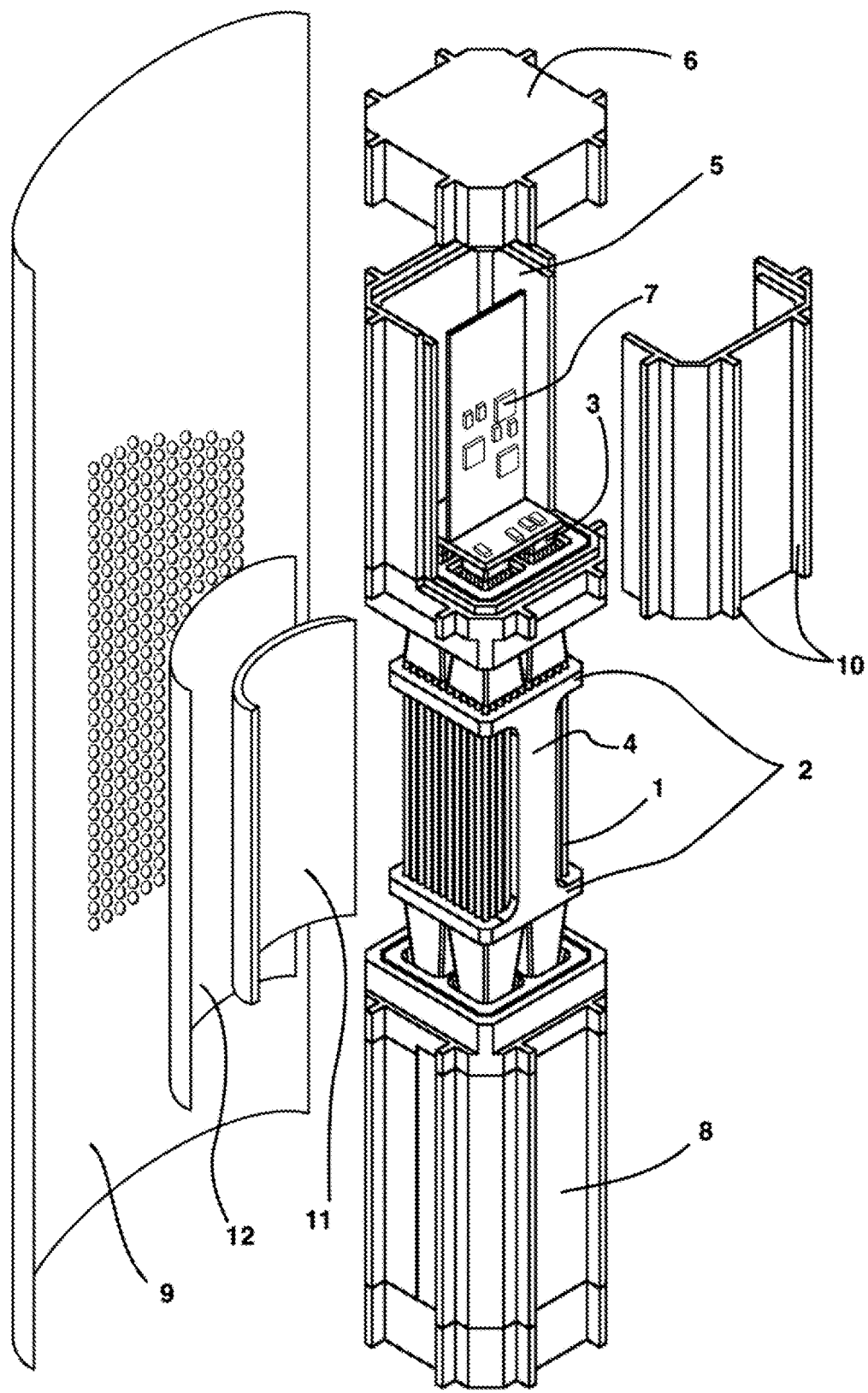

SUBSURFACE CONTINUOUS RADIOISOTOPE ENVIRONMENTAL MONITOR

This application claims the priority of Provisional U.S. Patent Application Ser. No. 63/276,720 filed Nov. 8, 2021.

The United States Government may have certain rights to this invention under Management and Operating Contract No. DE-AC05-06OR23177 from the Department of Energy.

BACKGROUND OF THE INVENTION

Existing state of the art for measurements of the concentration of subsurface plumes of tritiated water are variants of two principal methodologies: In the first, laboratory analysis, groundwater samples from wells or soil cores are collected and transported to analytical facilities. There, the samples are treated in carrier chemistry processes to remove some of the more significant interfering contaminants and then distilled to further isolate contaminants. The distilled samples are mixed with liquid scintillation materials and placed in dark chambers where dual photomultiplier tube coincidence counting is performed. The counting duration is a minimum of 15 minutes and extends to an hour to achieve good statistical resolution near the drinking water concentration limit. This method involves field personnel to obtain and transport the sample and laboratory personnel to prepare and process the sample.

The second method involves pumping of a water sample from a sump or well to a rack-mounted instrument. The concentration chemistry is performed by electrolysis separation of the tritium and hydrogen gas which are directed to a gas flow proportional counter within a shielded counting chamber. This process can be highly automated with minimum detectable concentration of 100,000 pCi/L achieved in 9 minutes. (Note that this level is 5 times the drinking water standard.) The commercial automated system is limited to collection of up to 6 sample lines. This system allows frequent sampling but necessitates a counting lab.

Both of the primary existing methods represent analytically precise and effective but inefficient labor intensive or time intensive use of limited laboratory equipment. Each of these current state-of-the-art methods approved by the NRC are only able to analyze a limited "snap shot" of the conditions at the collection point.

Accordingly, it would be desirable to provide a system for detecting and counting a low-energy beta contamination with interferences from other gamma and alpha emitting contaminants. Such a system would ideally maximize the beta-particle sensitivity and allow for spectroscopic separation of the beta signals from interfering higher energy contaminants. The system would address problems encountered by tritium monitoring of groundwater at waste burial areas, nuclear power plants, and at certain other fuel and weapons material production facilities.

BRIEF DESCRIPTION OF THE SEVERAL VIEWS OF THE DRAWING(S)

Reference is made herein to the accompanying drawings, which are not necessarily drawn to scale, and wherein:

FIG. 1 is an exploded isometric view of a subsurface continuous radioisotope environmental monitor for continuous in-situ monitoring for the possible presence of radioactive species in subsurface groundwater.

DETAILED DESCRIPTION OF THE INVENTION

The present invention is a Subsurface Continuous Radioisotope Environmental Monitor (SCREM) that provides a continuous monitoring of the possible presence of radioactive species in subsurface groundwater. Existing, traditional techniques obtain samples from wells followed by radioactive counting using liquid scintillators or other detection systems in laboratory settings. Essentially a snap shot of the radioisotopic conditions at the time of sampling. Other borehole logging methods employed in primarily the oil and gas industry use detectors temporarily lowered into wells to assess the geological environment to locate productive areas for oil and gas wells.

The subsurface continuous groundwater monitor of the current invention differs from either of the aforementioned noncontinuous environmental monitors in that the detector and its supporting system elements are specifically constructed and equipped to be placed into a well or borehole and left to continuously detect and record radiation decay of radioactive species that are borne by subsurface water flow to that sampling area. With battery replacement or external power the measurement times could extend from several months to multiple years. Continuous monitoring and recording offers benefits of longitudinal studies in time, and greater sensitivity, particularly where episodic flow of contaminants may be occurring and/or the radioisotopes are present at very low levels.

The system was inspired by the subsurface contamination monitoring requirements at sites that are known to have subsurface tritium contamination such that periodic core sampling of multiple locations is required over the period of many years. In-ground beta-particle detection techniques for monitoring ground water would be advantageous at such sites. Detecting and counting a low-energy beta-particle contamination in the presence of interferences from other gamma and alpha emitting contaminants requires a design somewhat different from any existing systems; maximizing beta-particle sensitivity and providing spectroscopic separation of the beta-particle signals from interfering higher energy contaminants.

Tritium is a byproduct of operation at nuclear power plants and at certain other fuel and weapons material production facilities. There are 95 nuclear power plants that all have existing groundwater monitoring systems in operation, and there are two new fuel processing facilities currently in the early phases of operation or permitting that will require some form of groundwater monitoring.

The SCREM operates by placing a detection element in a housing such that subsurface water that reaches the bore or well can flow in contact with the detection element. Alpha-particle, beta-particle or gamma-ray emissions from the radioactive isotope decay interact in the scintillator generating scintillation light which is optically coupled to solid state photon detectors. The use of so-called silicon photomultiplier photo-detection elements (SiPMs) allows for low cost, low power, small size and mechanical robustness that are all necessary to make a system suited for long-term environmental monitoring.

Tritium presents a particular challenge in detection because of the low energy of the emitted beta-particle (average energy ~6 keV). Design elements of the system address this challenge in the following ways:
  a. First, an unclad plastic scintillating plastic fiber is employed as the beta-particle to photon conversion material. The un-clad fiber thus presents a scintillating material in direct contact with groundwater. Minimum energy is lost from a beta-particle which travels toward the scintillating plastic;

b. Second, the fibers are made in 1.0 mm to 1.5 mm diameter to present a large surface area for a given scintillating material volume. Since the range of beta-particles in plastic is less than 1 mm a 1 mm fiber will capture nearly all of the beta-particle energy for half of the decays which occur close to the wetted scintillator surface. Smaller diameters cause more scintillation light to be lost while larger diameters reduce the area while not increasing conversion volume;

c. Third, the fibers are positioned in parallel and separated by a grid structure so that groundwater is able to flow in between fibers readily. This maximizes the wetted surface of the fibers while close spacing presents as much detection surface area as practical while minimizing dead volume of water from which the low energy beta-particles may not escape;

d. Fourth, the exposed length of the fibers is chosen to be from 2.0 to 5.0 inches to reduce the loss of the scintillation photons as they travel along the fibers;

e. Fifth, the fibers are brought together and glued at both ends and where an optically transparent adhesive transmits the scintillation light to a photodetector. This approach addresses two factors. The first is that photons of scintillation light are collected from both ends of the fibers, increasing the number of photons arriving at a photodetector and thus increasing the total signal. This approach, when applied with a coincidence detection requirement, almost completely eliminates the thermal background noise inherent in SiPM photon detectors;

f. Sixth, the pulse height of the signals from the photodetectors are independently recorded and then summed with the resultant histogram to allow spectroscopic analysis. Rather than simply counting pulses, spectroscopic analysis allows distinguishing the signals due to beta particles from other signals which may be due to other contaminants present; and g. Seventh, the detector is naturally shielded from much of the surrounding environmental background by the soil it is embedded in.

The aforementioned elements of the invention taken together overcome the challenge of detection of a low energy beta.

The nature of the typical subsurface radioisotope environment is low activity and thus presents low counting rates. Taking advantage of emerging low-power digital systems and with operational software optimized for low power, in this implementation the digitizer only "wakes" when a pulse is present, converts and stores it in non-volatile memory, then returns to sleep. Low count rates allow the electronics to remain in this quiescent minimal power consumption state much of the time. When awakened by an external request for data extraction, the system powers up its communication components, transfers data to a requesting device and again returns to quiescent minimal power.

Though the concept was initially developed specifically for tritium detection the system can employ several detection modes and materials to identify and monitor other radioactive elements. The primary mode for low-energy beta-particle emitting isotopes such as tritium, utilizes many small-dimension plastic scintillating fibers as the detection element and so presents a large surface area available for detection. These small-dimension fibers have low efficiency of detection for higher energy beta-particles and lower still for gamma-rays and alpha-particles or neutrons. Optimizing for other higher energy beta-particle emitting isotopes such as phosphorus or alpha-particle emitting isotopes leads to a larger dimension scintillating fiber. Gamma-ray emitting species are best detected with larger dimensioned inorganic scintillation materials. One could be 11 mm×11 mm cross section crystals of cesium iodide, coated with reflecting material and shaped to optically couple their scintillation light to the photodetectors. Neutron emitting species may also find plastic scintillator based materials optimum but with single piece 11 mm×11 mm cross section of scintillator tapered at the ends. A combination of up to four different detector materials, can be included in a single detector assembly to allow for the detection of a range of emitted particles with a single installation.

With the inclusion of multiple detector materials, the system may be able to provide data that allow improved statistics for identification. This is particularly true for environments in which there are significant quantities of interfering contaminants. Identifying and quantifying these other contaminants improves the estimate of the subject contaminant (tritium).

The SiPMs are operated in a coincidence spectroscopy configuration. This method, collecting emitted scintillation light from two photo-detection elements significantly reduces spurious signals due to thermal noise in the photodetector elements as well as increasing the total collected signal from one scintillation event. The magnitude of detected light pulses is recorded so that spectroscopic analysis can be used on the recorded data to identify multiple b- or gamma-ray energies and the emitting isotopes.

With reference to FIG. 1 a first embodiment of the SCREM according to the present invention includes four groups or bundles of scintillating fibers 1 individually separated by combs 2 to maximize fiber surface area. Ends of each of the four fiber groups are drawn together at each end and optically mated to photodetectors 3. A fiber support structure 4 holds the combed fiber bundles rigidly to the photodetectors and is mated to a multipart housing comprised of two sides 5 and an end cap 6. The photodetectors are electrically coupled to preamplifier, temperature sensing and bias control circuitry 7. Photodetectors, preamplifiers and bias circuitry are also attached at the opposing ends of the fiber and contained in similar multipart housing shown here closed 8. The housings 5, 6, 8, fiber support structure 4 and optical mating are enclosed in a perforated stainless-steel cylinder 9. The shape of the multipart housings provides channel guides 10 for cables that extend to the surface to be laid inside the cylinder for protection. Surrounding the fiber region is a thin copper wool antimicrobial layer 11 and surrounding that is a filter fabric layer 12.

Longevity of the detection system with its unclad scintillation fibers is enhanced in several ways by the design detailed above. The fibers are mechanically protected by the stainless-steel permeable cylinder and further by the fiber support structure. Intrusion of silt or sediment is prevented by the filter fabric and a copper wool layer defends against bacterial or fungal growth. The structure maintains rigidity to prevent mechanical stresses to the fiber and assure continued optical coupling of fiber ends to the photodetectors. The filter fabric limits intrusion of silt or other material which could reduce the effective area for detection. The copper wool layer acts as a microbial deterrent to reduce growth of bacteria within the detector cell.

The described invention addresses several of the previous technical limitations of systems that might have been deployed into subsurface continuous monitoring installations. Power consumption of the photo-detection and/or photo-multiplication methods has been the most obvious obstacle, but data conversion and data storage contribute to the total energy requirement for a monitoring system.

The use of the SiPMs does reduce power consumption drastically, but they bring with them a challenge of gain matching and a characteristic gain variation with temperature. The described system provides compensation for this gain variation by including either one of two different methods. A temperature sensor and bias offset method may be employed for the lowest power battery-operated modes. This makes use of the slow time variation of temperature in the subsurface environment and a temperature sensor coupled through software to an offset voltage that compensates for the temperature induced gain variation. Where more power is available the passive compensation method of U.S. Pat. No. 9,123,611, described by McKis son et al., provides a simpler passive compensation.

The data conversion and storage electronics are chosen for low power operation. To achieve the low noise performance necessary for low energy beta-particle and gamma-ray detection, the first stages of the photodetector electronics are located within 15 mm of the photodetector. Additional data acquisition electronics that perform digitization and storage are located at the surface where a variety of methods may be employed to communicate results to the user. Battery supplies for detector operation and the digital logic are envisioned for most installations, and, when combined with low power RF communication for extraction of the stored data elements, allow a practical implementation with very low requirements at the surface. In some installations solar power could supplement batteries extending the time required between maintenance.

The system's detector assemblies might be placed into bore holes or lowered into wells. Other placement methods are possible. In some configurations multiple detector assemblies may be attached and placed at different depths in the bore hole. Each detector assembly could have its own independent data acquisition system, or multiple detector assemblies could share a single data acquisition system and power source.

One embodiment of the device is shown in FIG. 1 which illustrates the use of a SiPM (Silicon Photo Multiplier) and plastic scintillator fibers with physical properties and dimensions chosen to allow optimum dynamic detection of tritium in ground water.

An exemplary device according to the invention may include one or more of the following features:
  a. A continuous battery or mains operated in situ groundwater radioactivity monitoring device utilizing coincidence detection of scintillating photons with local electronic data acquisition for recording the digitized detection events.
  b. Plastic scintillator elements permitting contact with groundwater.
  c. Crystal scintillator elements permitting contact with groundwater.
  d. Two or more scintillator elements used in the manner of a so-called "phoswich" arrangement in which sandwiched layers of differing scintillator materials are bonded together into a single element and then shaped so as to fit in the describe detector system.
  e. Solid-state photodetectors
  f. Compensation for photodetector temperature coefficient of gain
  g. Embedded software controlling detection events, power conservation and data communication to the user.
  h. rigid permeable housing
  i. filter fabric
  j. copper antimicrobial The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment shown and described herein was chosen and described in order to best explain the principles of the invention and the practical application, and to enable others of ordinary skill in the art to understand the invention for various embodiments with various modifications as are suited to the particular use contemplated.

We claim:

1. A subsurface continuous in situ environmental monitor for detecting the presence of radioactive species in subsurface groundwater, comprising:
   one or more photodetectors and one or more scintillators optically coupled to the photodetectors;
   the photodetectors and scintillators mounted within a water permeable enclosure;
   a fabric layer and an antimicrobial layer within said water permeable enclosure and enclosing said one or more photodetectors and said one or more scintillators;
   preamplifier electronics;
   a multipart housing; and
   channel guides in said multipart housing, said channel guides to extend cables.

2. The environmental monitor of claim 1 comprising said scintillators are scintillating fibers.

3. The environmental monitor of claim 2 comprising one or more combs to secure said fibers rigidly into one or more bundles of fibers and to maximize the surface area of the fibers exposed to any groundwater entering through said permeable enclosure.

4. The environmental monitor of claim 3 comprising each of said bundles of fibers include ends and each of said ends are optically mated at each end to the photodetector.

5. The environmental monitor of claim 4 comprising a fiber support structure securing each of the fibers rigidly to their corresponding fiber bundles.

6. The environmental monitor of claim 5 wherein the photodetectors are electronically connected to preamplifier, temperature sensing, and bias control circuitry.

7. The environmental monitor of claim 6 comprising:
   the photodetectors are secured to said multipart housing, said multipart housing having a first and second part; and
   each part of the housing includes two sides and an end cap.

8. The environmental monitor of claim 7 comprising the photodetectors, preamplifiers and bias circuitry are secured at the opposing ends of the fibers and contained in said first and second part of said housing.

9. The environmental monitor of claim 8 comprising a perforated cylinder enclosing said fiber support structure and said optical mating.

10. The environmental monitor of claim 9 comprising said perforated cylinder is constructed of stainless steel.

11. A subsurface continuous in situ environmental monitor for detecting the presence of radioactive species in subsurface groundwater, comprising:
   one or more photodetectors and one or more scintillators optically coupled to the photodetectors;

the photodetectors and scintillators mounted within a water permeable enclosure;
a fabric layer and an antimicrobial layer within said water permeable enclosure and enclosing said one or more photodetectors and said one or more scintillators;
preamplifier electronics; and
said antimicrobial layer is constructed of copper wool.

\* \* \* \* \*